United States Patent
Tian et al.

(10) Patent No.: US 12,026,835 B2
(45) Date of Patent: Jul. 2, 2024

(54) COMPUTER-IMPLEMENTED METHODS FOR SIMULATING DEFORMATION IN REAL-WORLD SCENE, ELECTRONIC DEVICES, AND COMPUTER-READABLE STORAGE MEDIUM

(71) Applicant: GUANGDONG OPPO MOBILE TELECOMMUNICATIONS CORP., LTD., Dongguan (CN)

(72) Inventors: Yuan Tian, Palo Alto, CA (US); Yi Xu, Palo Alto, CA (US); Yuxin Ma, Palo Alto, CA (US); Yu Gao, Palo Alto, CA (US); Jun Liu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 136 days.

(21) Appl. No.: 17/857,314

(22) Filed: Jul. 5, 2022

(65) Prior Publication Data
US 2022/0335691 A1 Oct. 20, 2022

Related U.S. Application Data

(63) Continuation of application No. PCT/CN2020/114040, filed on Sep. 8, 2020.
(Continued)

(51) Int. Cl.
*G06T 17/20* (2006.01)
*G06T 15/08* (2011.01)
*G06T 19/00* (2011.01)

(52) U.S. Cl.
CPC ............. *G06T 17/20* (2013.01); *G06T 15/08* (2013.01); *G06T 19/006* (2013.01); *G06T 2210/12* (2013.01)

(58) Field of Classification Search
CPC ....... G06T 17/20; G06T 15/08; G06T 19/006; G06T 2210/12; G06T 19/20
See application file for complete search history.

(56) References Cited

U.S. PATENT DOCUMENTS 11,216,948 B2 * 1/2022 Yang .................. G06T 7/11
2016/0364907 A1 12/2016 Schoenberg
(Continued)

FOREIGN PATENT DOCUMENTS

CN 107105333 A 8/2017
CN 108986220 A 12/2018
(Continued)

OTHER PUBLICATIONS

International Search Report and Written Opinion Dated Dec. 9, 2020 From the International Searching Authority Re. Application No. PCT/CN2020/114040, 9 pages.

Primary Examiner — Chong Wu
(74) Attorney, Agent, or Firm — BAYES PLLC

(57) ABSTRACT

The present disclosure provides a computer-implemented method. The method includes: acquiring 3D volumetric data for representing a real-world scene; acquiring a current set of active 3D volumetric data from the 3D volumetric data in response to an activating action on the 3D volumetric data; updating a plurality of sets of active 3D volumetric data based on the current set of active 3D volumetric data, the plurality of sets of active 3D volumetric data being acquired from the 3D volumetric data; constructing a surface based on the plurality of updated sets of active 3D volumetric data; and simulating a deformation of a part of the real-world scene based on the surface, the part of the real-world scene corresponding to the plurality of updated sets of active 3D volumetric data. In addition, the present disclosure also provides an electronic device, and a storage medium.

20 Claims, 6 Drawing Sheets

Related U.S. Application Data

(60) Provisional application No. 62/957,702, filed on Jan. 6, 2020.

(56) References Cited

U.S. PATENT DOCUMENTS

| | | |
|---|---|---|
| 2018/0035017 A1 | 2/2018 | Kim |
| 2020/0372709 A1* | 11/2020 | Ponjou Tasse ............ G06T 7/55 |

FOREIGN PATENT DOCUMENTS

| | | |
|---|---|---|
| CN | 109242923 A | 1/2019 |
| CN | 109389590 A | 2/2019 |

\* cited by examiner

COMPUTER-IMPLEMENTED METHODS FOR SIMULATING DEFORMATION IN REAL-WORLD SCENE, ELECTRONIC DEVICES, AND COMPUTER-READABLE STORAGE MEDIUM

CROSS-REFERENCE TO RELATED APPLICATIONS

This application is a continuation of International Application No. PCT/CN2020/114040, filed on Sep. 8, 2020, which claims the benefit of priority of U.S. Provisional Application No. 62/957,702, filed on Jan. 6, 2020, the contents of which are incorporated herein by reference in their entireties.

TECHNICAL FIELD

The present disclosure relates to the field of augmented reality technologies, and more particularly, to a computer-implemented method for simulating a deformation in a real-world scene, an electronic device, and a computer-readable storage medium.

BACKGROUND

In an Augmented Reality (AR) application presented on frameworks and devices, such as Hololens, Magic Leap One, ARcore, and ARkit, geometric information of a real-world static scene may be scanned and stored in advance and a scene map may be established accordingly, i.e., three-dimensional (3D) reconstruction.

One AR application is to augment the real object(s) in the scene with physical simulation (e.g. deformation). Specifically, the visual result(s) of simulation may be added to the scene scanned in advance, for example, virtual drilling in a wall, and virtual cracking on the floor. The physical simulation for virtual deformation of real objects, for example, deforming a portion of a sculpture and augmenting the real sculpture with simulation result for display, may be applied for many fields such as art, games, and medical care.

SUMMARY

A first aspect of the present disclosure provides a computer-implemented method including: acquiring 3D volumetric data for representing a real-world scene; acquiring a current set of active 3D volumetric data from the 3D volumetric data in response to an activating action on the 3D volumetric data; updating a plurality of sets of active 3D volumetric data based on the current set of active 3D volumetric data, the plurality of sets of active 3D volumetric data being acquired from the 3D volumetric data; constructing a surface based on the plurality of updated sets of active 3D volumetric data; and simulating a deformation of a part of the real-world scene based on the surface, the part of the real-world scene corresponding to the plurality of updated sets of active 3D volumetric data.

A second aspect of the present disclosure provides an electronic device including: a memory, a processor, and a computer program stored on the memory and operable on the processor. When the program is executed by the processor, the method according to the first aspect is implemented.

A third aspect of the present disclosure provides a computer-readable storage medium on which a computer-readable storage instruction is stored. The computer-readable storage instruction is configured to cause a computer to implement the method according to the first aspect.

Additional aspects and advantages of embodiments of the present disclosure will be given in part in the following descriptions, become apparent in part from the following descriptions, or be learned from the practice of the embodiments of the present disclosure.

BRIEF DESCRIPTION OF DRAWINGS

The above and/or additional aspects and advantages of embodiments of the present disclosure will become apparent and more readily appreciated from the following descriptions made with reference to the drawings, in which.

DETAILED DESCRIPTION

Figure 1:
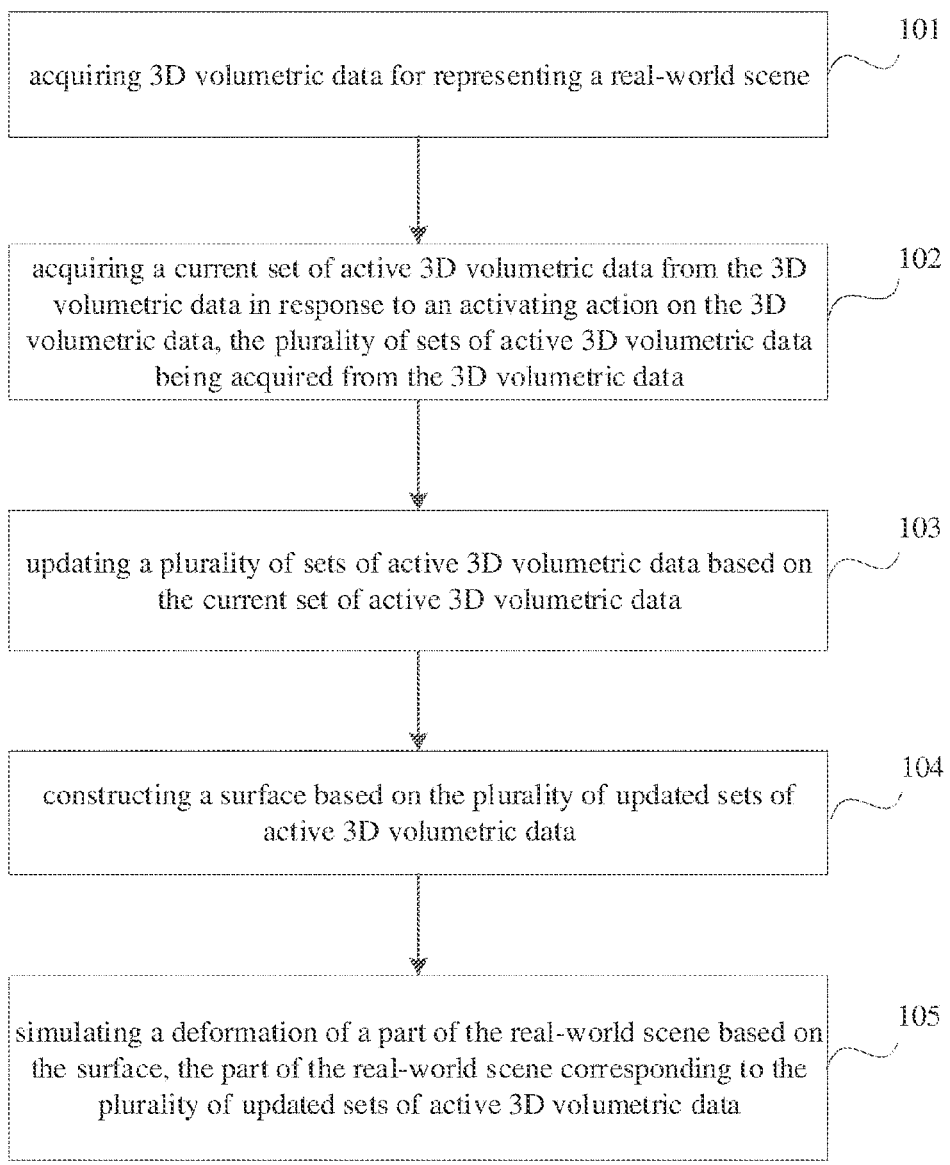
FIG. 1 is a flowchart of a method for an augmented reality scene according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, which serve to explain the present disclosure. The embodiments are not construed to limit embodiments of the present disclosure.

In AR applications, geometric information of the real-world static scene may be scanned and stored in advance. The scanned geometric information may be represented by data in an implicit data structure. Algorithms may be executed on the data in the implicit data structure to convert the data in the implicit data structure into data in an explicit data structure. The object segmentation may be performed based on the data in the explicit data structure to obtain the segmented objects. Physical simulation such as deformation simulation may be performed on the segmented objects, for example, cloth deformation or soft body deformation.

However, when one object contains a large amount of geometric details, such as simulating the deformation of a sculpture object, or simulating the deformation of a wall as a piece of fabric, the physical simulation for the whole object is very time consuming. In addition, it does not rule out the case of simulating and scanning simultaneously in the AR scene. Furthermore, the physical simulation requires the generation of new data in the explicit data structure after scanning each frame, which will increase the processing time per frame, leading to slow simulation update for objects with complex geometric information.

The present disclosure is to provide a method for an augmented reality scene, directed to the technical problem that the deformation simulation of the object is time-consuming and the simulation speed is slow in the related art.

With this method, when detecting that the virtual object collides with the real scene (i.e., the virtual object is placed into the augmented reality scene by a user, such as a virtual person or a virtual ball is dragged into the augmented reality scene, or the virtual object in the augmented reality scene is controlled to be interacted with the augmented reality scene, such as the virtual ball is patted by the user), a region of interest (ROI) corresponding to the current collision in the scene is extracted. If there are a set of global regions which may be acquired for a set of collisions, the ROI is combined with the existing global regions when there is overlapping between the ROI and the one or more of the existing global regions. When there is no overlapping between the ROI and each of the existing global regions, the ROI will be treated as a new global region. Also, if there is no global region, the ROI will be treated as a new global region. Finally, deformation corresponding to the collisions is simulated based on the global regions to generate a deformation simulation result. The external force that drives the deformation may be simulated using the collision penetration distance based on the global regions to realize the deformation simulation on the global regions. Thereby, deformation simulation may be computed on the global regions instead of all the objects and all data structures of the scene, thus the simulation speed is greatly improved.

FIG. 1 is a flowchart of a method for an augmented reality scene according to an embodiment of the present disclosure.

The embodiments of the present disclosure provide an apparatus for an augmented reality scene, to implement the method for an augmented reality scene. The apparatus may be applied for any electronic device, such that the electronic device may perform the above-described function of simulating the deformation within the augmented reality scene. The electronic device may be, for example, a hardware device having various operating systems, touch screens, and/or display screens, such as a mobile phone, a tablet computer, a personal digital assistant, a wearable device, or the like.

As illustrated in FIG. 1, the method includes acts in the following blocks.

At block 101, 3D volumetric data for representing a real-world scene is acquired.

Depth data for the real-world scene may be captured by a depth camera, and the 3D volumetric data may be acquired based on the depth data captured.

In an embodiment, the 3D volumetric data may include a set of voxels in a Signed Distance Function (SDF), or a Truncated Signed Distance Function (TSDF). For example, if a Red Green Blue Depth (RGB-D) camera is employed to capture the scene, the captured depth data may be represented by data in the SDF or TSDF to reconstruct the 3-dimensional scene.

SDF is a 3D geometric data structure. The input of SDF is a space coordinate of a point and the output of SDF is a directional distance indicating the closest distance from the input point to the closest 3D geometric surface. The idea of SDF is to utilize a large volume as a 3-dimensional map (or model) to be reconstructed, and to express the volume as many small voxels. Each voxel corresponds to a point in the real-world scene. According to SDF, one voxel has a vertex or a central point containing the closest Euclidean distance to the closest 3D geometric surface. TSDF is an improved version of SDF. TSDF saves directional distance(s) only near the geometric surface and performs truncation at the remain region.

SDF and TSDF are implicit data structures. A Marching Cubes algorithm may be employed on the data in the implicit data structure to generate an explicit 3-dimensional expression, such as triangular mesh or point cloud. The basic unit contained in SDF or TSDF, i.e., the voxel, is generally a cube with metric information. If the cube contains a portion of the surface of the scanned scene, each vertex stores a Euclidean distance to the surface, and if the cube does not contain a portion of the surface of the scanned scene, each vertex is assigned with a default insignificant value.

At block 102, a current set of active 3D volumetric data is acquired from the 3D volumetric data in response to an activating action on the 3D volumetric data.

In an embodiment, the activating action includes: an interaction of an input means with one or more objects in the real-world scene, or an interaction of a virtual object, which exists in the real-world scene or is inputted into the real-world scene, with one or more objects in the real-world scene.

For example, in the AR scene (i.e., the 3D reconstructed static scene for the real-world scene), a simulation program (on an AR device) may acquire user's input (e.g. gesture selection) or interaction of a virtual object with the augmented reality scene (e.g. a bouncing ball). In detail, when the user inputs an operation through the input means such as a remote controller or a gesture, for example, dragging a certain portion of an object in the AR scene, the activating action is detected. Or, when the virtual object is placed in the AR scene, the virtual object collides with the real-world scene, and the activating action is detected.

In this case, the fast collision detection is performed to detect the activating action. The fast collision detection may be performed as follows. The virtual object (or the input means) may be represented by the data of the explicit data structure, such as triangular mesh or point cloud. Based on the data of the explicit data structure, a bounding box encompassing the data of the explicit data structure of the virtual object may be acquired, and the bounding box may be represented by the corresponding 3D volumetric data. The collision detection may be implemented by querying the bounding box in the 3D volumetric data for representing the real-world scene. In response to that the bounding box is queried in the 3D volumetric data for representing the real-world scene, the activating action is detected.

The current set of active 3D volumetric data may correspond to the ROI in the AR scene.

At block 103, a plurality of sets of active 3D volumetric data are updated based on the current set of active 3D volumetric data. The plurality of sets of active 3D volumetric data are acquired from the 3D volumetric data.

At block 104, a surface is constructed based on the plurality of updated sets of active 3D volumetric data.

In an embodiment, a Marching Cubes algorithm may be executed on the plurality of updated sets of active 3D volumetric data to construct the surface. The surface constructed may be represented by a surface mesh or a surface point cloud, which is not limited herein.

At block 105, a deformation of a part of the real-world scene is simulated based on the surface. The part of the real-world scene corresponds to the plurality of updated sets of active 3D volumetric data.

With the method, the active 3D volumetric data is utilized to construct the surface but not all 3D volumetric data, and the deformation corresponding to the part of the real-world scene is simulated based on the constructed surface. Thereby, the simulation speed is greatly improved.

In an embodiment, the plurality of sets of active 3D volumetric data is empty. In this case, the current set of 3D volumetric data may be directly utilized to construct the surface.

In an embodiment, the plurality of sets of active 3D volumetric data is not empty. That is, there may be a set of global regions in the scene which may be acquired for a set of collisions. In this case, an embodiment may be illustrated in FIG. 2.

Figure 2:
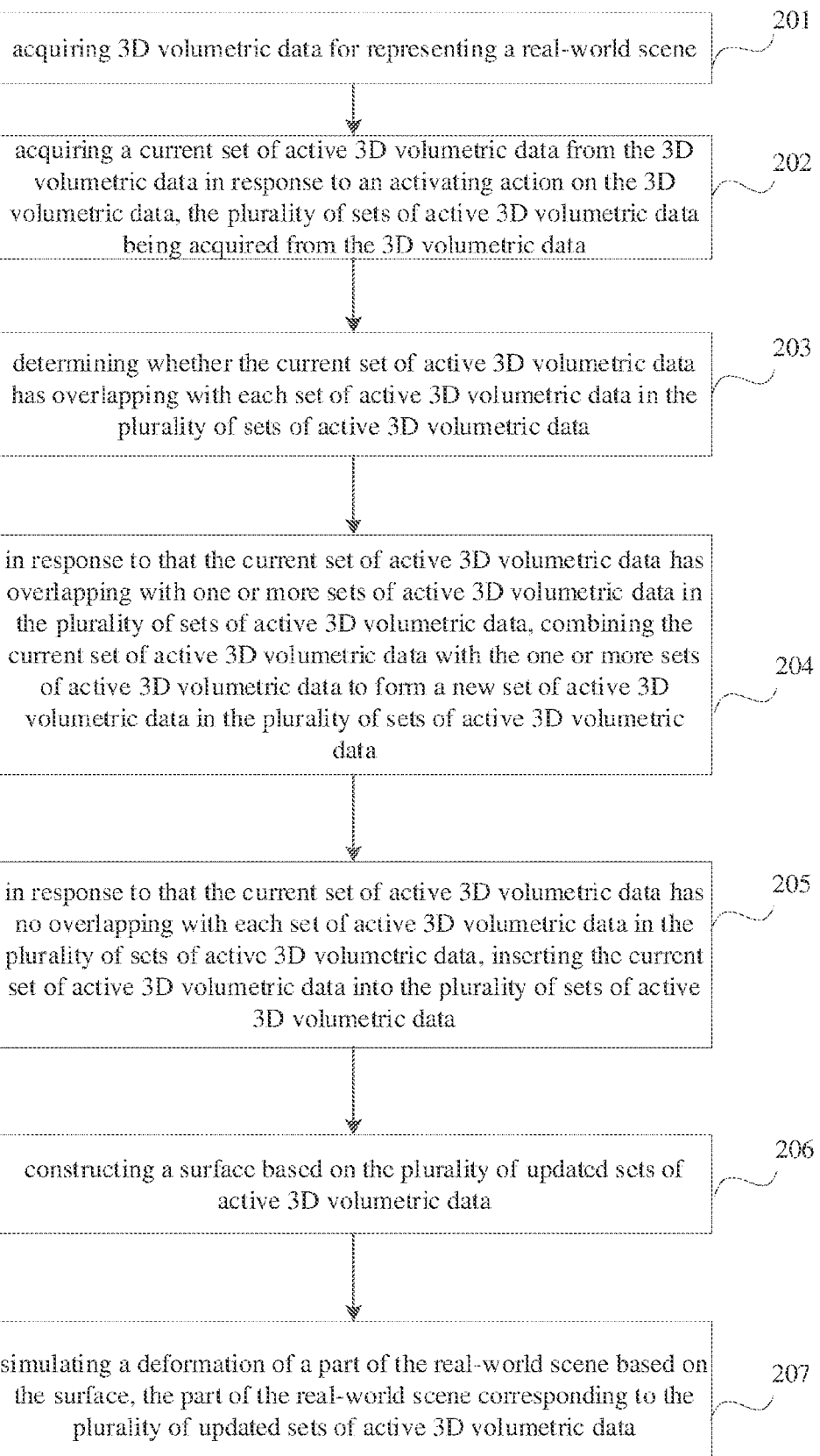
FIG. 2 is a flowchart of a method for an augmented reality scene according to an embodiment of the present disclosure.

As illustrated in FIG. 2, the method includes acts in the following blocks.

At block 201, 3D volumetric data for representing a real-world scene is acquired.

At block 202, a current set of active 3D volumetric data is acquired from the 3D volumetric data in response to an activating action on the 3D volumetric data.

At block 203, it is determined whether the current set of active 3D volumetric data has overlapping with each set of active 3D volumetric data in the plurality of sets of active 3D volumetric data.

At block 204, in response to that the current set of active 3D volumetric data has overlapping with one or more sets of active 3D volumetric data in the plurality of sets of active 3D volumetric data, the current set of active 3D volumetric data is combined with the one or more sets of active 3D volumetric data to form a new set of active 3D volumetric data in the plurality of sets of active 3D volumetric data.

At block 205, in response to that the current set of active 3D volumetric data has no overlapping with each set of active 3D volumetric data in the plurality of sets of active 3D volumetric data, the current set of active 3D volumetric data is inserted into the plurality of sets of active 3D volumetric data.

If there are a plurality of collisions detected in the scene, the regions corresponding to the collisions need to be combined. If there is overlapping between the ROI corresponding to a current collision and one of the existing global regions, the ROI is combined with the existing global region. If there is no overlapping between the ROI and each of the existing global regions, the ROI will be treated as a new region, and added into the global regions.

For example, there are 3 regions on one wall that need to be deformed due to gesture operations by the user. If the user's new gesture operation is inputted, the new region in the scene becomes a ROI. If the ROI is overlapped with one of the 3 regions, the overlapped region may be combined with the ROI to form a new region, thus 3 new regions need to be deformed. If the ROI is not overlapped with each of the 3 regions, the ROI is treated as a new one to acquire 4 regions to be deformed.

At block 206, a surface is constructed based on the plurality of updated sets of active 3D volumetric data.

At block 207, a deformation of a part of the real-world scene is simulated based on the surface. The part of the real-world scene corresponds to the plurality of updated sets of active 3D volumetric data.

With the method, the plurality of sets of active 3D volumetric data are updated based on the overlapping, thus the simulation speed is further improved.

Furthermore, the deformation is simulated to generate a deformation result, and the augmented reality scene will be colored and rendered based on the deformation simulation result. In the embodiments of the present disclosure, after the deformation simulation result is acquired, the deformation simulation result may be rendered in a shader as texture mapping, i.e., the deformation simulation result is added to the current AR display by the shader.

As a possible implementation manner, when the virtual object collides with the real scene, all collision voxels are determined, and a bounding box is generated based on all collision voxels. The smallest bounding box is used as the ROI. The above process will be described in detail below in combination with the embodiment in FIG. 3.

Figure 3:
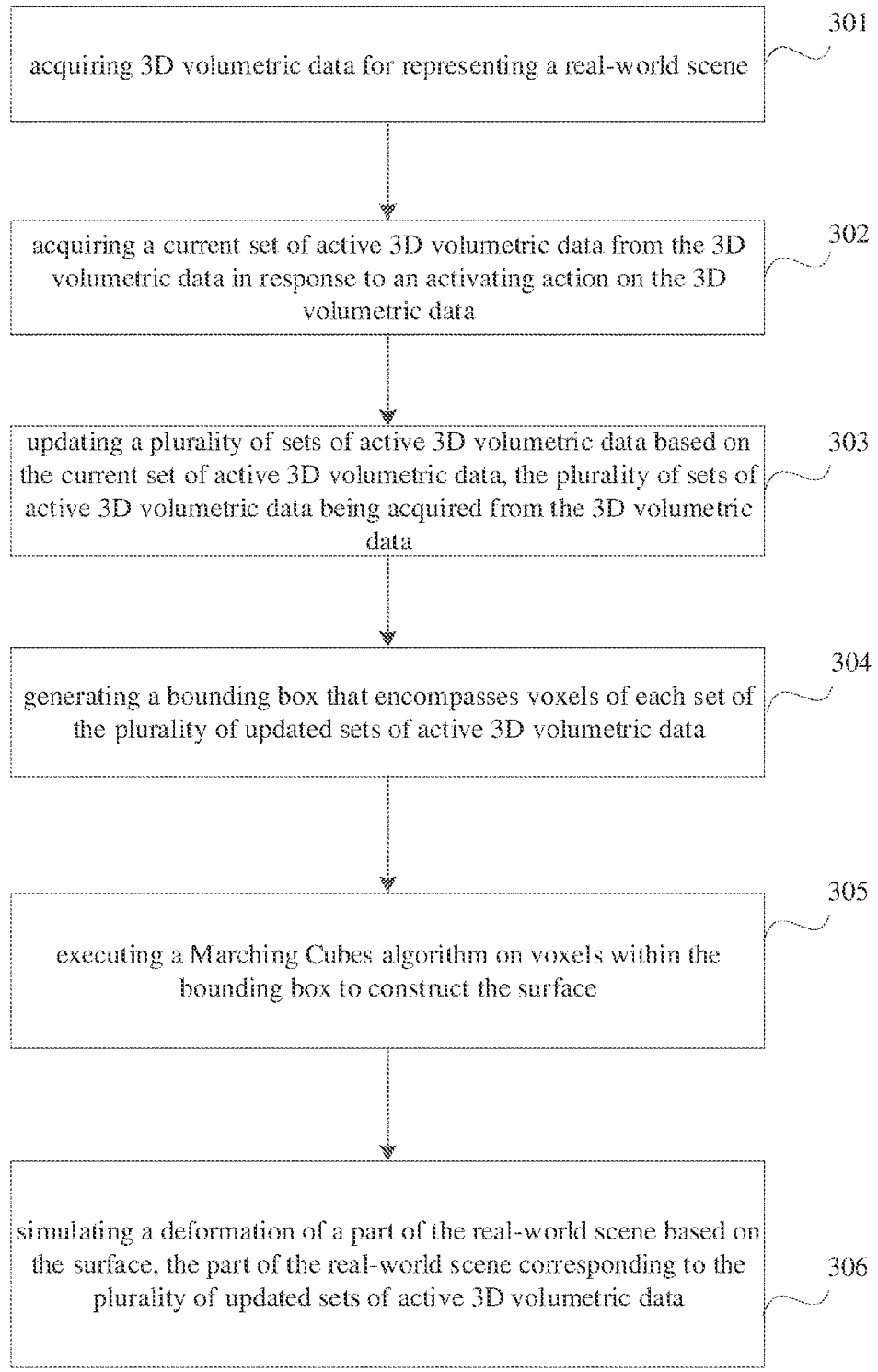
FIG. 3 is a flowchart of a method for an augmented reality scene according to an embodiment of the present disclosure.

FIG. 3 is a flowchart of a method for an augmented reality scene according to an embodiment of the present disclosure.

As illustrated in FIG. 3, the method includes acts in the following blocks.

At block 301, 3D volumetric data for representing a real-world scene is acquired.

At block 302, a current set of active 3D volumetric data is acquired from the 3D volumetric data in response to an activating action on the 3D volumetric data.

At block 303, a plurality of sets of active 3D volumetric data are updated based on the current set of active 3D volumetric data. The plurality of sets of active 3D volumetric data are acquired from the 3D volumetric data.

At block 304, a bounding box for encompassing voxels of each set of the plurality of updated sets of active 3D volumetric data is generated.

As a possible implementation, when the physical elasticity of the collided virtual object is different, the generated bounding box may be different. For example, when the physical elasticity of the virtual object is strong, the bounding box may be larger, and when the physical elasticity of the virtual object is weak, the bounding box may be small. Therefore, in the present disclosure, the material property of the virtual object may be acquired or defined first, then the elastic coefficient k of the virtual object is acquired based on the material property. Then the bounding box is generated based on the plurality of collision voxels and the elastic coefficient. In this way, an initial bounding box may be determined based on the plurality of collision voxels, and the radius of the initial bounding box is multiplied by the coefficient k to acquire the generated bounding box. k is bigger than 1, and is controlled by the simulation parameters of the virtual object (e.g. the elastic coefficient of the virtual object). The simulation parameters of the virtual object may be set by the user, or may be set by default. The stronger the physical elasticity, the larger the k.

At block 305, a Marching Cubes algorithm is executed on the bounding box to construct the surface.

At block 306, a deformation of a part of the real-world scene is simulated based on the surface. The part of the real-world scene corresponds to the plurality of updated sets of active 3D volumetric data.

As a possible implementation, the act in blocks 105, 207, and 306 is described in detail below in combination with the embodiment in FIG. 4.

Figure 4:
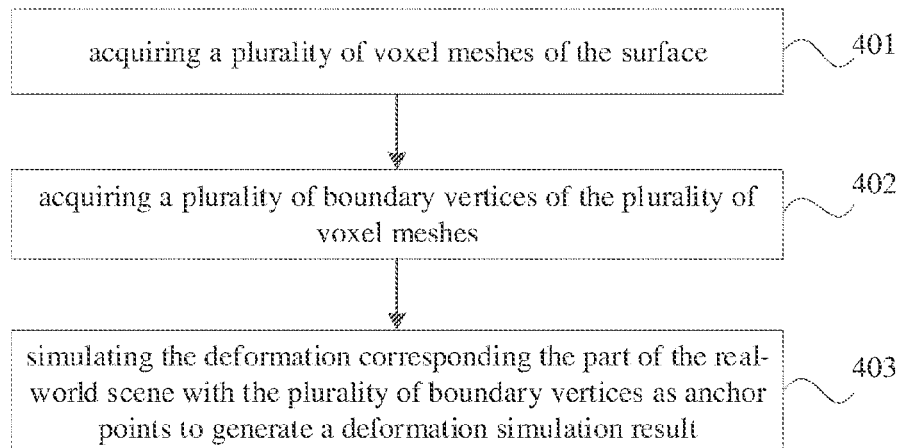
FIG. 4 is a flowchart of a method for an augmented reality scene according to an embodiment of the present disclosure.

FIG. 4 is a flowchart of a method for an augmented reality scene according to an embodiment of the present disclosure.

At block 401, a plurality of voxel meshes of the surface are acquired.

At block 402, a plurality of boundary vertices of the plurality of voxel meshes are acquired.

In the embodiments of the present disclosure, the active 3D volumetric data may be processed to quickly generate the plurality of voxel meshes. For example, when performing fast meshing, the updated active 3D volumetric data is processed by Marching Cubes algorithm, to quickly generate a plurality of triangular meshes, or to generate voxel meshes such as tetrahedron meshes by other methods, and then finite element analysis is used to achieve more accurate physical simulation, which is not limited herein. Normally, the active 3D volumetric data is smaller than the entire scene, thus the generation speed of voxel meshes is fast. Then the plurality of boundary vertices of the plurality of voxel meshes are acquired.

At step 403, the deformation of the part of the real-world scene is simulated with the plurality of boundary vertices as anchor points to generate a deformation simulation result.

Figure 5:
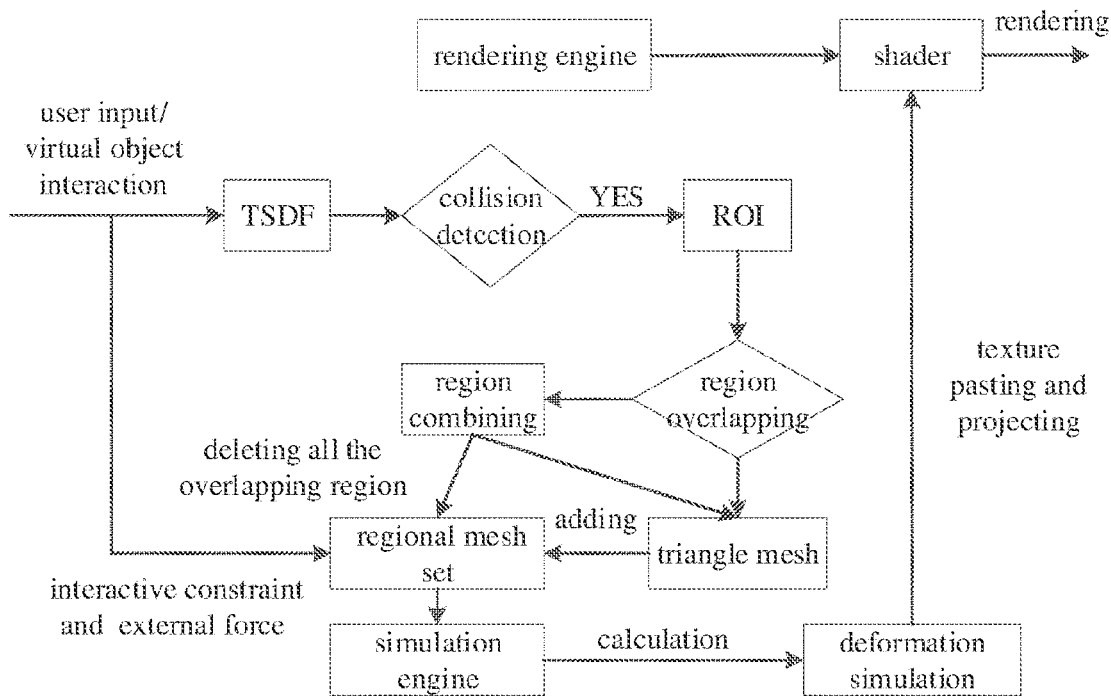
FIG. 5 is a flowchart of a method for an augmented reality scene according to an embodiment of the present disclosure.
Figure 6:
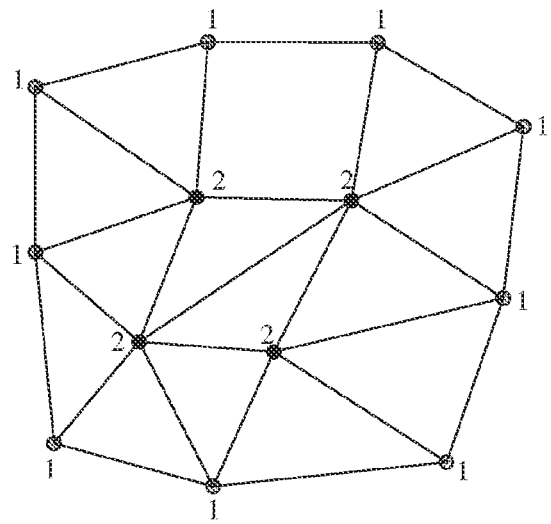
FIG. 6 is a schematic diagram of a voxel grid according to an embodiment of the present disclosure.

For example, referring to FIG. 5, the generated voxel mesh may be added to a regional mesh set, and the regional mesh set is inputted to the physical simulation engine in the current iterative process to calculate the deformation simulation result. The boundary vertices of the voxel meshes may exist as anchor points. In the physical simulation such as deformation, these boundary vertices remain unchanged. For example, referring to FIG. 6, boundary vertice 1 acts as the anchor point, the position remains unchanged, and non-boundary vertice 2 participates in the physical simulation.

In the physics simulation engine, if the current voxel mesh has not changed in the previous step, the previous simulation result, the user-defined constraint (e.g. drag points), the interactive external force (e.g., collision, gravity) are inputted. If the current voxel mesh is processed and combined, that is, regions have been combined, the user-defined constraint, the interactive external force, and the simulation result of the voxel meshes of all the combined regions in the previous step taken as the initial value are inputted. That is, in the present disclosure, the deformation simulation result is calculated by the constraints generated through the interaction and the external force.

It should be noted that in the present disclosure, fast meshing is applicable for deformation simulation. In practical applications, fast meshing may also be used for other physical simulations, such as, haptic simulation. When the user touches or interacts with a virtual object through a haptic device (e.g., glove), a mesh and a normal may be quickly generated, and the haptic force feedback may be calculated.

Currently, 3D volumetric data is used to reconstruct 3D scenes and create triangular meshes in real time for 3D rendering. In detail, a selective mesh surface may be used for regeneration, and the environment is represented by a plurality of subsets, and only if the distance function of the subset changes beyond a certain threshold, a mesh is generated again, so that the overhead of generating the mesh of each frame is reduced. For 3D rendering in the 3D reconstruction process, a selective update of each frame of the mesh is generated to speed up the mesh regeneration.

However, referring to FIG. 5, the present disclosure is for quick simulation of the object deformed, and fast mesh generation is for the simulation region of interest (ROI), instead of the region of variation in the 3D reconstruction process. In detail, in the present disclosure, the ROI generated by interaction between the user's input/virtual objects and the TSDF is extracted, that is, the interactive ROI is quickly acquired based on the TSDF. The ROI is treated as the new simulation region to be deformed, and is combined with the current set of regions. Fast meshing is performed on the updated region set, and the voxel mesh is used for deformation simulation. The deformation simulation result is calculated by the constraints generated by the interaction and the external force. Therefore, the whole simulation process may save a lot of time for voxel mesh regeneration. The assumption of small deformation makes the results of local simulation close to the effects of whole objects and scene simulation, and it is suitable for the rapid simulation of small deformation using TSDF data structure.

The method for an augmented reality scene in the embodiment of the present disclosure can save a lot of time for voxel mesh regeneration by performing fast meshing in the updated region set and using the voxel mesh to perform deformation simulation.

In order to realize the above embodiments, the present disclosure further provides an apparatus for an augmented reality scene.

Figure 7:
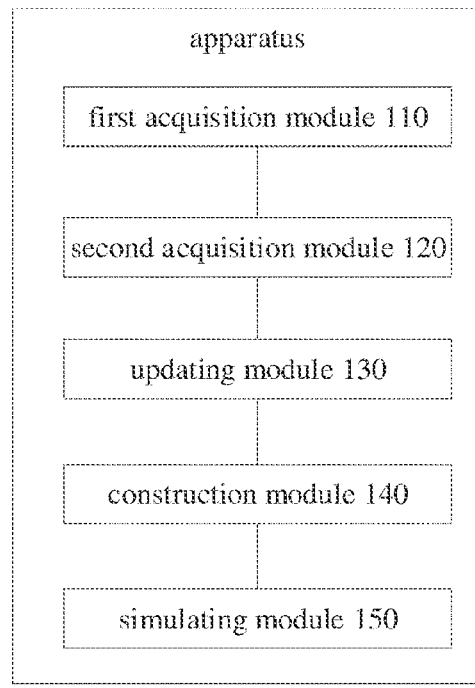
FIG. 7 is a block diagram of an apparatus for an augmented reality scene according to an embodiment of the present disclosure.

FIG. 7 is a block diagram of an apparatus for an augmented reality scene according to an embodiment of the present disclosure. As illustrated in FIG. 7, the apparatus includes: a first acquisition module 110, a second acquisition module 120, an updating module 130, a construction module 140, and a simulating module 150.

The first acquisition module 110 is configured to acquire 3D volumetric data for representing a real-world scene. The second acquisition module 120 is configured to acquire a current set of active 3D volumetric data from the 3D volumetric data in response to an activating action on the 3D volumetric data. The updating module 130 is configured to update a plurality of sets of active 3D volumetric data based on the current set of active 3D volumetric data. The plurality of sets of active 3D volumetric data are acquired from the 3D volumetric data. The construction module 140 is configured to construct a surface based on the plurality of updated sets of active 3D volumetric data. The simulating module 150 is configured to simulate a deformation of a part of the real-world scene based on the surface, the part of the real-world scene corresponding to the plurality of updated sets of active 3D volumetric data.

In an embodiment, the activating action includes: an interaction of an input means with one or more objects in the real-world scene, or an interaction of a virtual object, which exists in the real-world scene or is inputted into the real-world scene, with one or more objects in the real-world scene.

In an embodiment, the updating module 130 is configured to: determine whether the current set of active 3D volumetric data has overlapping with each set of active 3D volumetric data in the plurality of sets of active 3D volumetric data; in response to that the current set of active 3D volumetric data has overlapping with one or more sets of active 3D volumetric data in the plurality of sets of active 3D volumetric data, combine the current set of active 3D volumetric data with the one or more sets of active 3D volumetric data to form a new set of active 3D volumetric data in the plurality of sets of active 3D volumetric data; and in response to that the current set of active 3D volumetric data has no overlapping with each set of active 3D volumetric data in the plurality of sets of active 3D volumetric data, insert the current set of active 3D volumetric data into the plurality of sets of active 3D volumetric data.

In an embodiment, the construction module 140 is configured to: execute a Marching Cubes algorithm on the plurality of updated sets of active 3D volumetric data to construct the surface.

In an embodiment, the construction module 140 is configured to: generate a bounding box that encompasses voxels of each set of the plurality of updated sets of active 3D volumetric data; and execute a Marching Cubes algorithm on voxels within the bounding box to construct the surface.

In an embodiment, the construction module 140 is configured to: generate a bounding box that encompasses voxels of each set of the plurality of updated sets of active 3D volumetric data; acquire a material property of an object corresponding to each set of the plurality of updated sets of active 3D volumetric data in the real-world scene; acquire an elastic coefficient of the object based on the material property; enlarge the bounding box based on the elastic coefficient; and execute a Marching Cubes algorithm on voxels within the enlarged bounding box to construct the surface In an embodiment, the simulating module 150 is configured to: acquire a plurality of voxel meshes of the surface; acquire a plurality of boundary vertices of the plurality of voxel meshes; and simulate the deformation of the part of the real-world scene with the plurality of boundary vertices as anchor points to generate a deformation simulation result.

Figure 8:
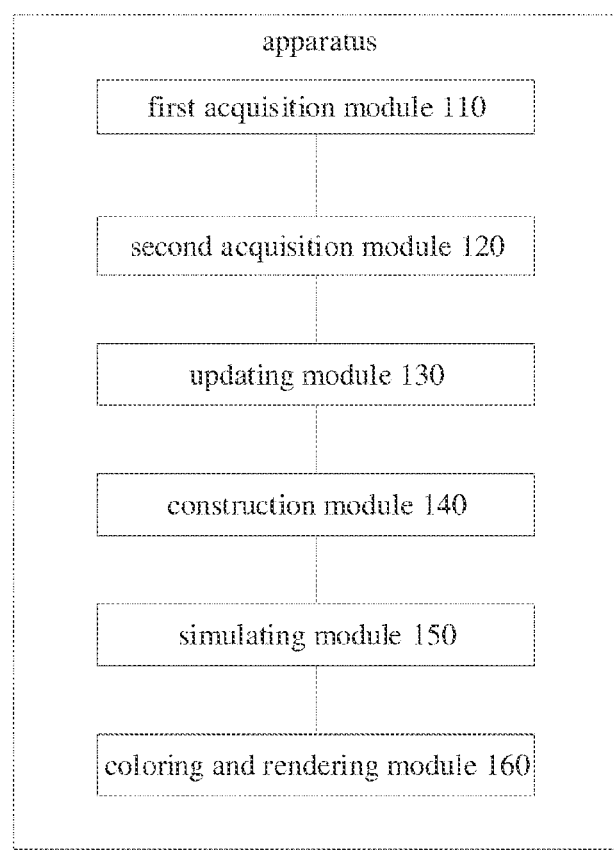
FIG. 8 is a block diagram of an apparatus for an augmented reality scene according to an embodiment of the present disclosure.

As illustrated in FIG. 8, the apparatus includes: a first acquisition module 110, a second acquisition module 120, an updating module 130, a construction module 140, a simulating module 150, and a coloring and rendering module 160.

The coloring and rendering module 160 is configured to color and render the deformation simulation result, and map the colored and rendered deformation simulation result to a 3-dimensional model reconstructed based on the 3D volumetric data for reconstructing the real-world scene.

It should be noted that the foregoing illustration of the method embodiments is also applicable for the apparatus embodiments, and the implementation principle is similar, which is not described herein again.

In order to realize the above embodiments, the present disclosure further provides an electronic device including a memory, a processor, and a computer program stored on the memory and operable on the processor. When the program is executed by the processor, the method according to the above embodiments is implemented.

In order to realize the above embodiments, the present disclosure further provides a computer readable storage medium on which a computer readable storage instruction is stored. The computer readable storage instruction is configured to cause a computer to implement the method according to the above embodiments.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to acquire the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A computer-implemented method, comprising:
   acquiring 3D volumetric data for representing a real-world scene;
   acquiring a current set of active 3D volumetric data from the 3D volumetric data in response to an activating action on the 3D volumetric data;
   updating a plurality of sets of active 3D volumetric data based on the current set of active 3D volumetric data in a combination or insertion manner, the plurality of sets of active 3D volumetric data being acquired from the 3D volumetric data;
   constructing a surface based on the plurality of updated sets of active 3D volumetric data; and
   simulating a deformation of a part of the real-world scene based on the surface, the part of the real-world scene corresponding to the plurality of updated sets of active 3D volumetric data.

2. The method of claim 1, wherein the activating action comprises: an interaction of an input means with one or more objects in the real-world scene, or an interaction of a virtual object with one or more objects in the real-world scene, the virtual object existing in the real-world scene or being inputted into the real-world scene.

3. The method of claim 1, wherein updating the plurality of sets of active 3D volumetric data based on the current set of active 3D volumetric data comprises:
   determining whether the current set of active 3D volumetric data has overlapping with each set of active 3D volumetric data in the plurality of sets of active 3D volumetric data;
   in response to that the current set of active 3D volumetric data has overlapping with one or more sets of active 3D volumetric data in the plurality of sets of active 3D volumetric data, combining the current set of active 3D volumetric data with the one or more sets of active 3D volumetric data to form a new set of active 3D volumetric data in the plurality of sets of active 3D volumetric data; and
   in response to that the current set of active 3D volumetric data has no overlapping with each set of active 3D volumetric data in the plurality of sets of active 3D volumetric data, inserting the current set of active 3D volumetric data into the plurality of sets of active 3D volumetric data.

4. The method of claim 1, wherein constructing the surface based on the plurality of updated sets of active 3D volumetric data comprises:
   executing a Marching Cubes algorithm on the plurality of updated sets of active 3D volumetric data to construct the surface.

5. The method of claim 1, wherein constructing the surface based on the plurality of updated sets of active 3D volumetric data comprises:
   generating a bounding box that encompasses voxels of each set of the plurality of updated sets of active 3D volumetric data; and
   executing a Marching Cubes algorithm on voxels within the bounding box to construct the surface.

6. The method of claim 1, wherein constructing the surface based on the plurality of updated sets of active 3D volumetric data comprises:
   generating a bounding box that encompasses voxels of each set of the plurality of updated sets of active 3D volumetric data;
   acquiring a material property of an object corresponding to each set of the plurality of updated sets of active 3D volumetric data in the real-world scene;
   acquiring an elastic coefficient of the object based on the material property;
   enlarging the bounding box based on the elastic coefficient; and
   executing a Marching Cubes algorithm on voxels within the enlarged bounding box to construct the surface.

7. The method of claim 1, wherein simulating the deformation of the part of the real-world scene based on the surface comprises:
   acquiring a plurality of voxel meshes of the surface;
   acquiring a plurality of boundary vertices of the plurality of voxel meshes; and
   simulating the deformation of the part of the real-world scene with the plurality of boundary vertices as anchor points to generate a deformation simulation result.

8. The method of claim 7, further comprising:
   coloring and rendering the deformation simulation result, and mapping the colored and rendered deformation simulation result to a 3-dimensional model reconstructed based on the 3D volumetric data for reconstructing the real-world scene.

9. The method of claim 1, wherein the 3D volumetric data comprises a set of voxels in a signed distance function, or in a truncated signed distance function.

10. The method of claim 1, wherein the plurality of sets of active 3D volumetric data is empty.

11. An electronic device, comprising:
    a memory;
    a processor; and
    a computer program stored on the memory and operable on the processor,
    wherein the program is configured to be executed by the processor, to perform:
    acquiring 3D volumetric data for representing a real-world scene;
    acquiring a current set of active 3D volumetric data from the 3D volumetric data in response to an activating action on the 3D volumetric data;
    updating a plurality of sets of active 3D volumetric data based on the current set of active 3D volumetric data in a combination or insertion manner, the plurality of sets of active 3D volumetric data being acquired from the 3D volumetric data;
    constructing a surface based on the plurality of updated sets of active 3D volumetric data; and
    simulating a deformation of a part of the real-world scene based on the surface, the part of the real-world scene corresponding to the plurality of updated sets of active 3D volumetric data.

12. The device of claim 11, wherein updating the plurality of sets of active 3D volumetric data based on the current set of active 3D volumetric data comprises:
    determining whether the current set of active 3D volumetric data has overlapping with each set of active 3D volumetric data in the plurality of sets of active 3D volumetric data;
    in response to that the current set of active 3D volumetric data has overlapping with one or more sets of active 3D volumetric data in the plurality of sets of active 3D volumetric data, combining the current set of active 3D volumetric data with the one or more sets of active 3D volumetric data to form a new set of active 3D volumetric data in the plurality of sets of active 3D volumetric data; and in response to that the current set of active 3D volumetric data has no overlapping with each set of active 3D volumetric data in the plurality of sets of active 3D volumetric data, inserting the current set of active 3D volumetric data into the plurality of sets of active 3D volumetric data.

13. The device of claim 11, wherein constructing the surface based on the plurality of updated sets of active 3D volumetric data comprises:
   executing a Marching Cubes algorithm on the plurality of updated sets of active 3D volumetric data to construct the surface.

14. The device of claim 11, wherein constructing the surface based on the plurality of updated sets of active 3D volumetric data comprises:
   generating a bounding box that encompasses voxels of each set of the plurality of updated sets of active 3D volumetric data; and
   executing a Marching Cubes algorithm on voxels within the bounding box to construct the surface.

15. The device of claim 11, wherein constructing the surface based on the plurality of updated sets of active 3D volumetric data comprises:
   generating a bounding box that encompasses voxels of each set of the plurality of updated sets of active 3D volumetric data;
   acquiring a material property of an object corresponding to each set of the plurality of updated sets of active 3D volumetric data in the real-world scene;
   acquiring an elastic coefficient of the object based on the material property;
   enlarging the bounding box based on the elastic coefficient; and
   executing a Marching Cubes algorithm on voxels within the enlarged bounding box to construct the surface.

16. The device of claim 11, wherein simulating the deformation of the part of the real-world scene based on the surface comprises:
   acquiring a plurality of voxel meshes of the surface;
   acquiring a plurality of boundary vertices of the plurality of voxel meshes; and
   simulating the deformation of the part of the real-world scene with the plurality of boundary vertices as anchor points to generate a deformation simulation result.

17. The device of claim 16, wherein the program is configured to be executed by the processor, to further perform:
   coloring and rendering the deformation simulation result, and mapping the colored and rendered deformation simulation result to a 3-dimensional model reconstructed based on the 3D volumetric data for reconstructing the real-world scene.

18. The device of claim 11, wherein the 3D volumetric data comprises a set of voxels in a signed distance function, or in a truncated signed distance function.

19. A non-transient computer readable storage medium on which a computer program is stored, wherein the program is configured to be executed by a processor to perform a simulating method for an augmented reality scene, the method comprising:
   acquiring 3D volumetric data for representing a real-world scene;
   acquiring a current set of active 3D volumetric data from the 3D volumetric data in response to an activating action on the 3D volumetric data;
   updating a plurality of sets of active 3D volumetric data based on the current set of active 3D volumetric data in a combination or insertion manner, the plurality of sets of active 3D volumetric data being acquired from the 3D volumetric data;
   constructing a surface based on the plurality of updated sets of active 3D volumetric data; and
   simulating a deformation of a part of the real-world scene based on the surface, the part of the real-world scene corresponding to the plurality of updated sets of active 3D volumetric data.

20. The non-transient computer readable storage medium of claim 19, wherein updating the plurality of sets of active 3D volumetric data based on the current set of active 3D volumetric data comprises:
   determining whether the current set of active 3D volumetric data has overlapping with each set of active 3D volumetric data in the plurality of sets of active 3D volumetric data;
   in response to that the current set of active 3D volumetric data has overlapping with one or more sets of active 3D volumetric data in the plurality of sets of active 3D volumetric data, combining the current set of active 3D volumetric data with the one or more sets of active 3D volumetric data to form a new set of active 3D volumetric data in the plurality of sets of active 3D volumetric data; and
   in response to that the current set of active 3D volumetric data has no overlapping with each set of active 3D volumetric data in the plurality of sets of active 3D volumetric data, inserting the current set of active 3D volumetric data into the plurality of sets of active 3D volumetric data.

* * * * *